United States Patent
Yoshitani et al.

(10) Patent No.: US 8,588,576 B2
(45) Date of Patent: Nov. 19, 2013

(54) CONTENT REPRODUCTION DEVICE, TELEVISION RECEIVER, CONTENT REPRODUCTION METHOD, CONTENT REPRODUCTION PROGRAM, AND RECORDING MEDIUM

(75) Inventors: Hitoshi Yoshitani, Osaka (JP); Aya Minehara, Osaka (JP); Masahiro Tai, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/579,574

(22) PCT Filed: Feb. 25, 2011

(86) PCT No.: PCT/JP2011/054385
§ 371 (c)(1),
(2), (4) Date: Aug. 17, 2012

(87) PCT Pub. No.: WO2011/105579
PCT Pub. Date: Sep. 1, 2011

(65) Prior Publication Data
US 2012/0320278 A1    Dec. 20, 2012

(30) Foreign Application Priority Data

Feb. 26, 2010 (JP) .................. 2010-043168
Feb. 25, 2011 (JP) .................. 2011-040209

(51) Int. Cl.
*H04N 5/765* (2006.01)
*H04N 5/932* (2006.01)

(52) U.S. Cl.
USPC ........................ 386/200; 386/219; 386/218

(58) Field of Classification Search
USPC ......... 386/200, 218, 219, 227, 230, 239, 244, 386/245, 248, 312
See application file for complete search history.

(56) References Cited

U.S. PATENT DOCUMENTS

| | | | |
|---|---|---|---|
| 6,285,134 | B1 | 9/2001 | Yano et al. |
| 2004/0056881 | A1* | 3/2004 | Nagatani et al. .............. 345/716 |
| 2005/0206788 | A1 | 9/2005 | Eves et al. |
| 2008/0170075 | A1 | 7/2008 | Muramatsu et al. |
| 2010/0177247 | A1 | 7/2010 | Sekulovski et al. |

FOREIGN PATENT DOCUMENTS

| | | |
|---|---|---|
| EP | 2 043 079 A2 | 4/2009 |
| JP | 58-166183 U | 11/1983 |
| JP | 5-15600 A | 1/1993 |
| JP | 6-267664 | 9/1994 |
| JP | 8-149387 | 6/1996 |
| JP | 10-239467 | 9/1998 |
| JP | 11-73193 | 3/1999 |

(Continued)

OTHER PUBLICATIONS

International Search Report for International Application No. PCT/JP2011/054385, dated May 24, 2011.

*Primary Examiner* — Robert Chevalier
(74) *Attorney, Agent, or Firm* — Birch, Stewart, Kolasch & Birch, LLP

(57) ABSTRACT

A television (100) is a content reproduction device for reproducing a video or a sound of content, and includes (i) a content analyzing section (107) for extracting a prescribed feature from the content, and (ii) an optical device controlling section (118) for controlling, in accordance with the feature extracted by the content analyzing section (107), luminance of light to be emitted by an illumination section (119) incorporated in the television (100).

19 Claims, 4 Drawing Sheets

(56) References Cited

FOREIGN PATENT DOCUMENTS

| | | |
|---|---|---|
| JP | 2000-182783 A | 6/2000 |
| JP | 2004-228724 A | 8/2004 |
| JP | 2004-336489 A | 11/2004 |
| JP | 2006-42191 A | 2/2006 |
| JP | 2007-53518 A | 3/2007 |
| JP | 2008-177642 A | 7/2008 |
| JP | WO 2008/129505 A1 | 10/2008 |
| JP | 2009-86133 A | 4/2009 |
| JP | 2009-95065 A | 4/2009 |
| JP | 2010-511986 A | 4/2010 |
| WO | WO 2007/119277 A1 | 10/2007 |

* cited by examiner

CONTENT REPRODUCTION DEVICE, TELEVISION RECEIVER, CONTENT REPRODUCTION METHOD, CONTENT REPRODUCTION PROGRAM, AND RECORDING MEDIUM

TECHNICAL FIELD

The present invention relates particularly to a content reproduction device capable of controlling, in accordance with content to be reproduced, a light emitting section provided in a main body of, for example, a television receiver.

BACKGROUND ART

Various types of digital televisions have been developed and sold in accordance with their rapid widespread use.

Patent Literature 1 discloses a digital television including light emitting means for emitting surrounding light, as an example of such digital televisions. The digital television disclosed in Patent Literature 1 is configured to emit, from the light emitting means, surrounding light whose color is identical to a main color of a video while the video is being reproduced. Specifically, for example, the light emitting means emits mainly surrounding light of green that is a color of lawn while a video of a soccer game is being reproduced. Therefore, the digital television of Patent Literature 1 can more deeply absorb a viewer in a reproduced video or make the viewer feel as if he were actually there, depending on the reproduced video, as compared with a normal television including no light emitting means.

Patent Literatures 2 and 3 each disclose a video receiving device for controlling an illumination device, which is provided in a room where a display device is provided, to emit light whose luminance corresponds to a feature extractable from a video to be displayed by the display device.

CITATION LIST

Patent Literature

Patent Literature 1
Japanese Patent Application Publication, Tokukai No. 2009-95065 A (Publication Date: Apr. 30, 2009)
Patent Literature 2
Japanese Patent Application Publication, Tokukaihei No. 6-267664 A (Publication Date: Sep. 22, 1994)
Patent Literature 3
International Publication No. WO2007/119277 (Publication Date: Oct. 25, 2007)

SUMMARY OF INVENTION

Technical Problem

However, the digital television disclosed in Patent Literature 1 can neither so deeply absorb a viewer in a reproduced video nor make the viewer feel as if he were actually there, depending on the reproduced video.

That is, the digital television of Patent Literature 1 emits, from a light emitting section, surrounding light having the same color and similar luminance in cases where (i) the digital television reproduces a video, such as a video of a soccer game in which players crash hard into each other and (ii) the digital television reproduces a video, such as a video of a peaceful grassland where a breeze is blowing, which videos are identical in main colors to each other but remarkably different in impression made on a viewer from each other. Further, the digital television fails to make a viewer feel as if he were actually in a grassland while displaying a video of the grassland, in a case where the digital television emits remarkably bright green surrounding light. The digital television also fails to make a viewer feel as if he were actually watching a soccer game in a stadium while displaying a video of the soccer game, in a case where the digital television emits remarkably faint green surrounding light.

Meanwhile, the video receiving device of each of Patent Literatures 2 and 3 can control an illumination device, which is placed in, for example, a room where a television is installed, to emit light having luminance suitable for a video to be displayed by the television. Therefore, the video receiving device can make a viewer feel as if he were actually there.

However, the video receiving device may always change luminance of an entire room depending on a video to be displayed by a display device because the illumination device is an illumination device provided separately from the display device so as to illuminate the entire room. Therefore, the video receiving device causes a problem of making a person who is not watching the video in the same room uncomfortable.

A television (i) obtains content from a broadcasting signal received via an antenna or a network, from a recording section of a main body of the television, or from a recoding device externally connected to the television, and (ii) reproduces the content. Types of the content include a moving image and a static image. A category of TV programs includes movie, drama, sports, and news. Recently, viewers have increasingly viewed three-dimensional video content displayed on a stereoscopic display device (a general television) capable of displaying a three-dimensional video (3D video). Some of conventional stereoscopic display devices can correct, in accordance with the types of the content, a video to be displayed on a display and/or a sound to be reproduced by a speaker. There is, however, no stereoscopic display device for simultaneously controlling a light emitting section for illuminating, for example, a display logo, an icon, and a touch sensor section which are incorporated in, for example, a bezel provided so as to surround a display surface of a display.

The present invention was made in view of the problems, and a main object of the present inventions is to provide a content reproduction device capable of certainly absorbing a viewer in a reproduced video or making the viewer feel as if he were actually there, as compared with a conventional device, without making a non-viewer uncomfortable. Another object of the present invention is to provide a content reproduction device that yields a further effect that it is possible to tell at a glance, even from a light emitting section provided in a bezel part of a television, an operation state which changes depending on a feature of content to be inputted.

Solution to Problem

In order to attain the object, a content reproduction device of the present invention is configured to be a content reproduction device for controlling an output device to output a video or a sound of reproduced content, the content reproduction device, including: extraction means for extracting a prescribed feature from content; and light-emitting controlling means for controlling, in accordance with an extracted feature, luminance of light to be emitted by a light emitting section incorporated in the output device. What is meant by "feature" is, for example, a size of a motion vector of moving image content, a size of a sound of sound content, average luminance of image frames of moving image content, or average luminance of static image content.

According to the configuration, the content reproduction device changes, in accordance with the feature extracted from the content to be reproduced, the luminance of the light to be emitted by the light emitting section. For example, the content reproduction device controls the light emitting section to emit light having higher luminance in a case where the size of a motion vector is large, such as a case where moving image content of a soccer game is reproduced, whereas controls the light emitting section to emit light having lower luminance in a case where the size of a motion vector is small, such as a case where moving image content of a video of grassland is reproduced.

The light emitting section whose luminance is to be controlled by the content reproduction device is incorporated in the output device. Therefore, a change in luminance of light emitted by the light emitting section does not make a person who is not viewing content uncomfortable.

Hence, the content reproduction device can certainly absorb a viewer in reproduced content or make the viewer feel as if he were actually there, as compared with a conventional device, without making a non-viewer uncomfortable.

It should be noted that, for example, in a case where the content reproduction device is configured to control, in accordance with a supplied feature of content, luminance of light to be emitted by light emitting members of, e.g. a display logo, an icon, and a touch sensor section, which are incorporated in, for example, a bezel provided so as to surround a display screen of a display, the content reproduction device can notify a user of an operation state of a television by means of illumination of the display logo, the icon, and the touch sensor section, which operation state changes in accordance with a feature.

In order to attain the object, a content reproduction method of the present invention is configured to be a content reproduction method of a content reproduction device for controlling an output device to output a video or a sound of reproduced content, said method, including the steps of: (a) extracting a prescribed feature from content; and (b) controlling, in accordance with an extracted feature, luminance of light to be emitted by a light emitting section incorporated in the output device.

According to the configuration, the content reproduction method of the present invention yields an effect identical to that yielded by the content reproduction device of the present invention.

It is preferable to configure the content reproduction device of the present invention such that the content is moving image content or sound content, during reproduction of the content, the extraction means extracts, for each predetermined reproduction period, the feature from data of a video or a sound to be reproduced during a corresponding predetermined reproduction period, and the light-emitting controlling means controls the light emitting section to emit, for the each predetermined reproduction period, light having luminance in accordance with the feature extracted during the corresponding predetermined reproduction period by the extraction means.

The configuration allows the content reproduction device to yield a further effect of periodically controlling, in accordance with details of a video or a sound that is being reproduced, luminance of light to be emitted by the light emitting section, even while a piece of content is being reproduced.

Advantageous Effects of Invention

A content reproduction device of the present invention can certainly absorb a viewer in reproduced content or make the viewer feel as if he were actually there, as compared with a conventional device, without making a non-viewer uncomfortable.

BRIEF DESCRIPTION OF DRAWINGS

FIG. 1 is a block diagram illustrating a configuration of a television in accordance with an embodiment of the present invention.

Figure 2:
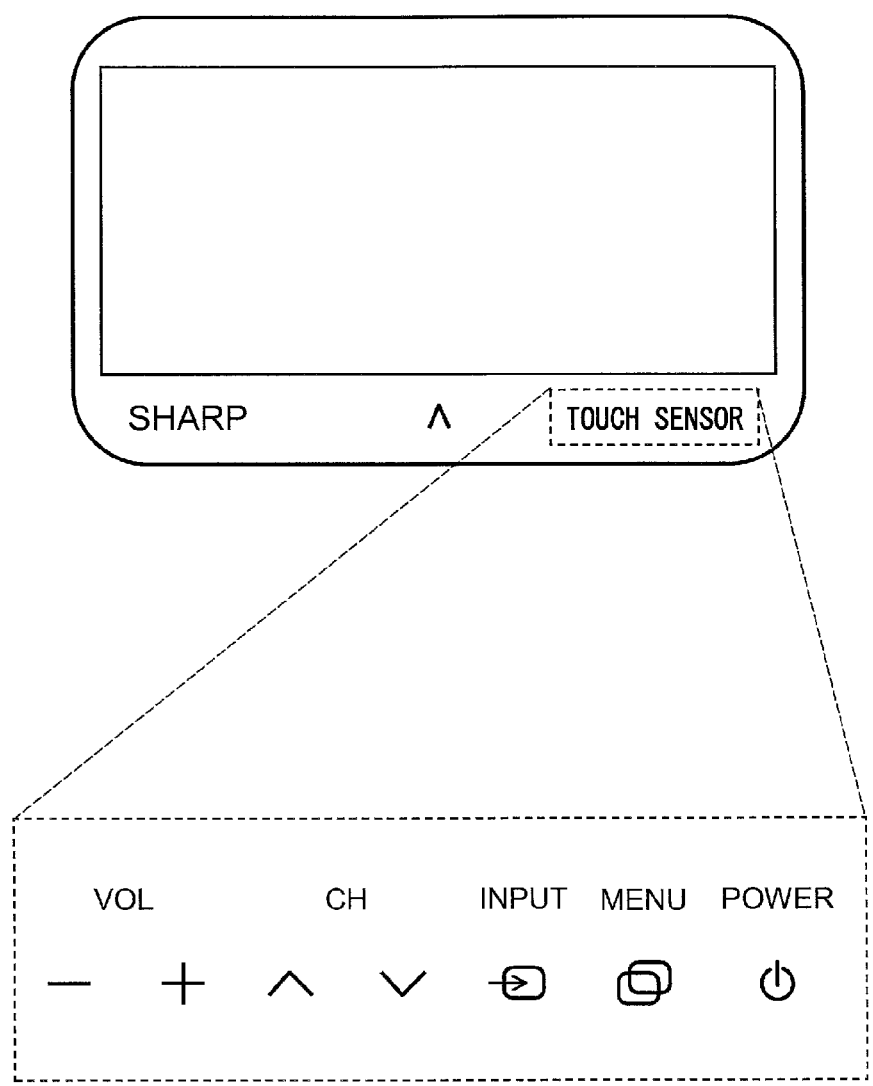
FIG. 2

An upper part of FIG. 2 is a view schematically illustrating a bezel provided in a television in accordance with an embodiment of the present invention, and a lower part of FIG. 2 is a view illustrating in detail UIs of a touch sensor section of the bezel.

FIG. 3

Figure 3:
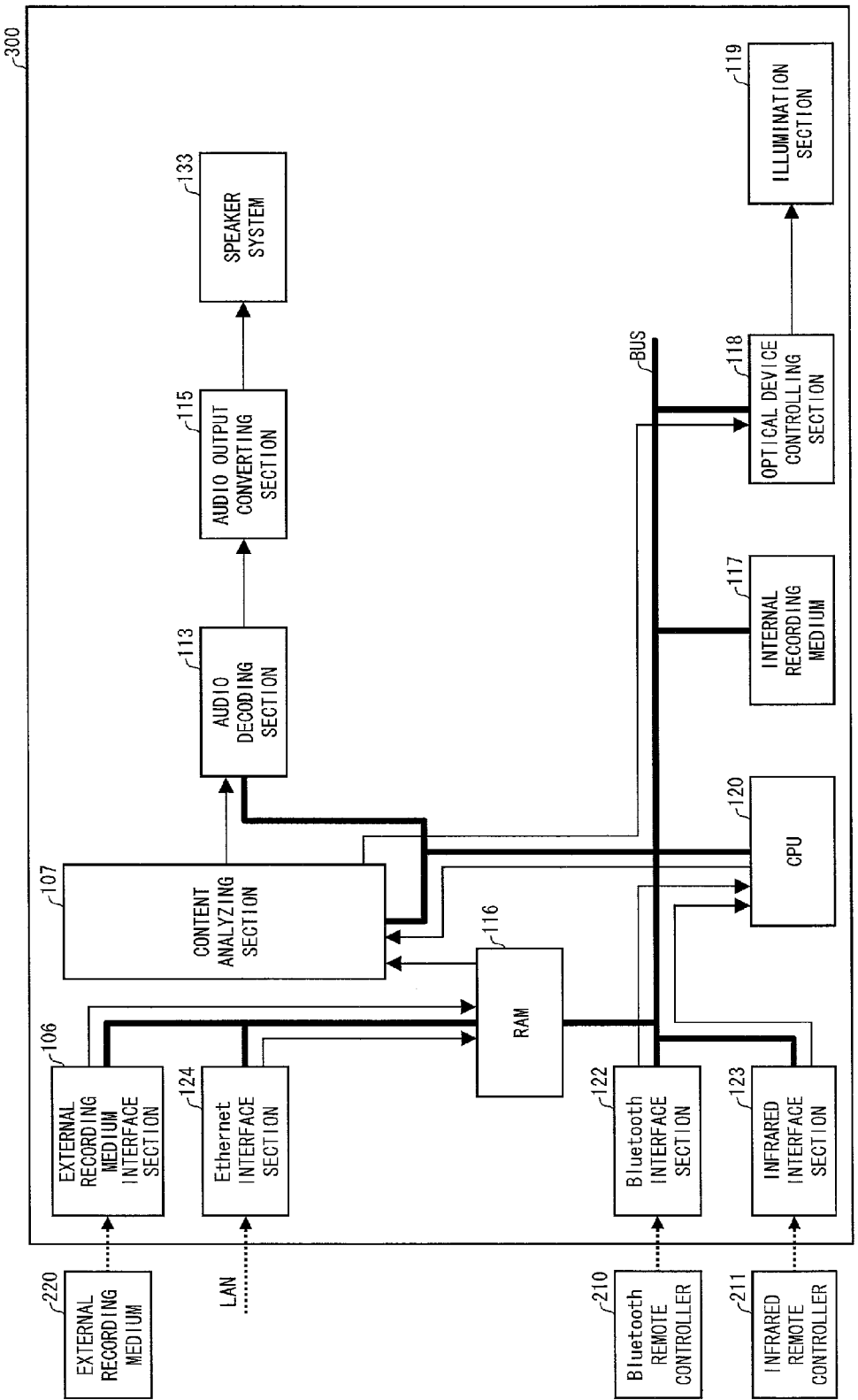

FIG. 3 is a block diagram illustrating a configuration of an audio device in accordance with another embodiment of the present invention.

FIG. 4

Figure 4:
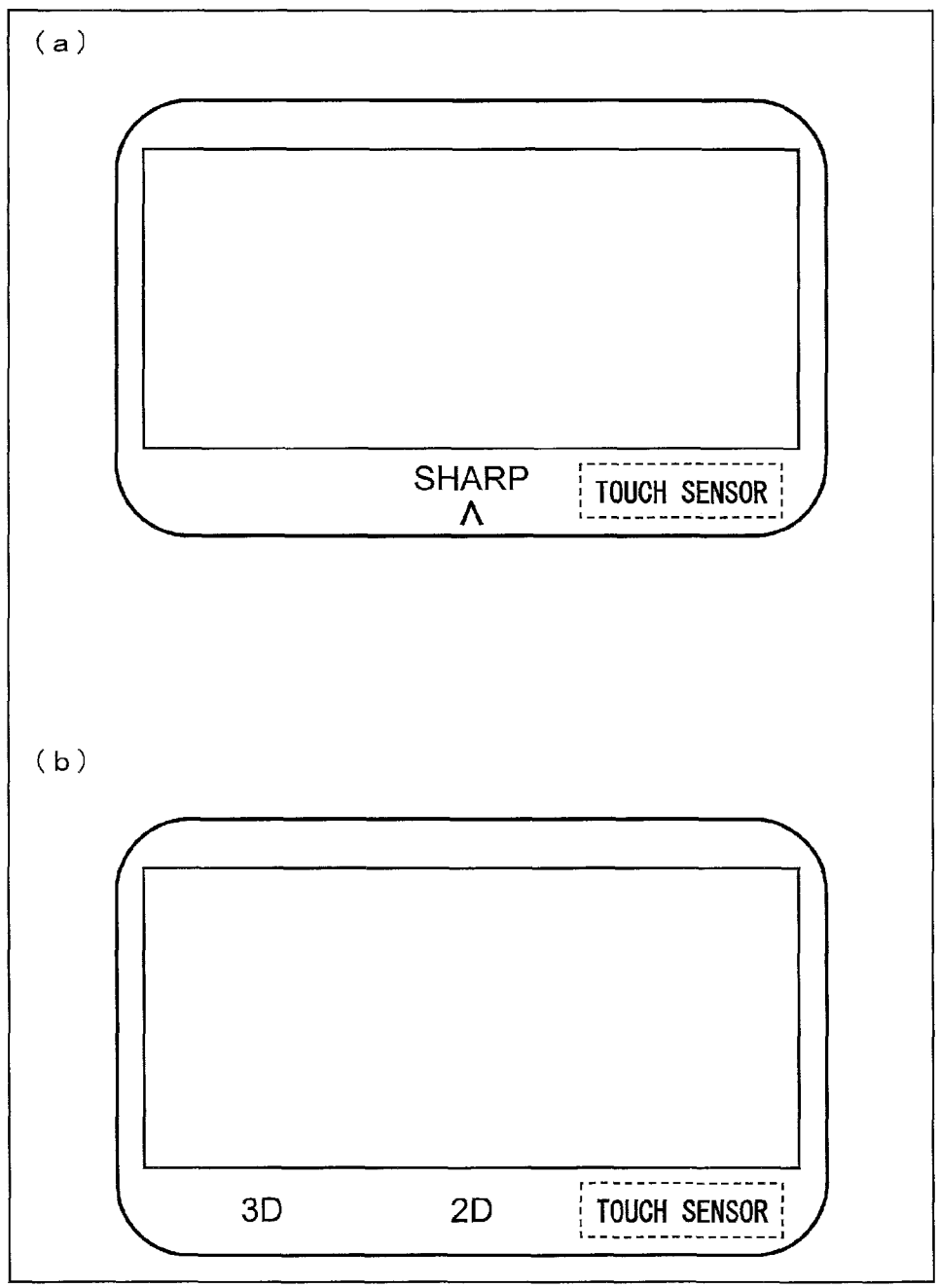

FIG. 4 is a view schematically illustrating two configuration examples of bezels different from the bezel illustrated in FIG. 2.

DESCRIPTION OF EMBODIMENTS

Figure 1:
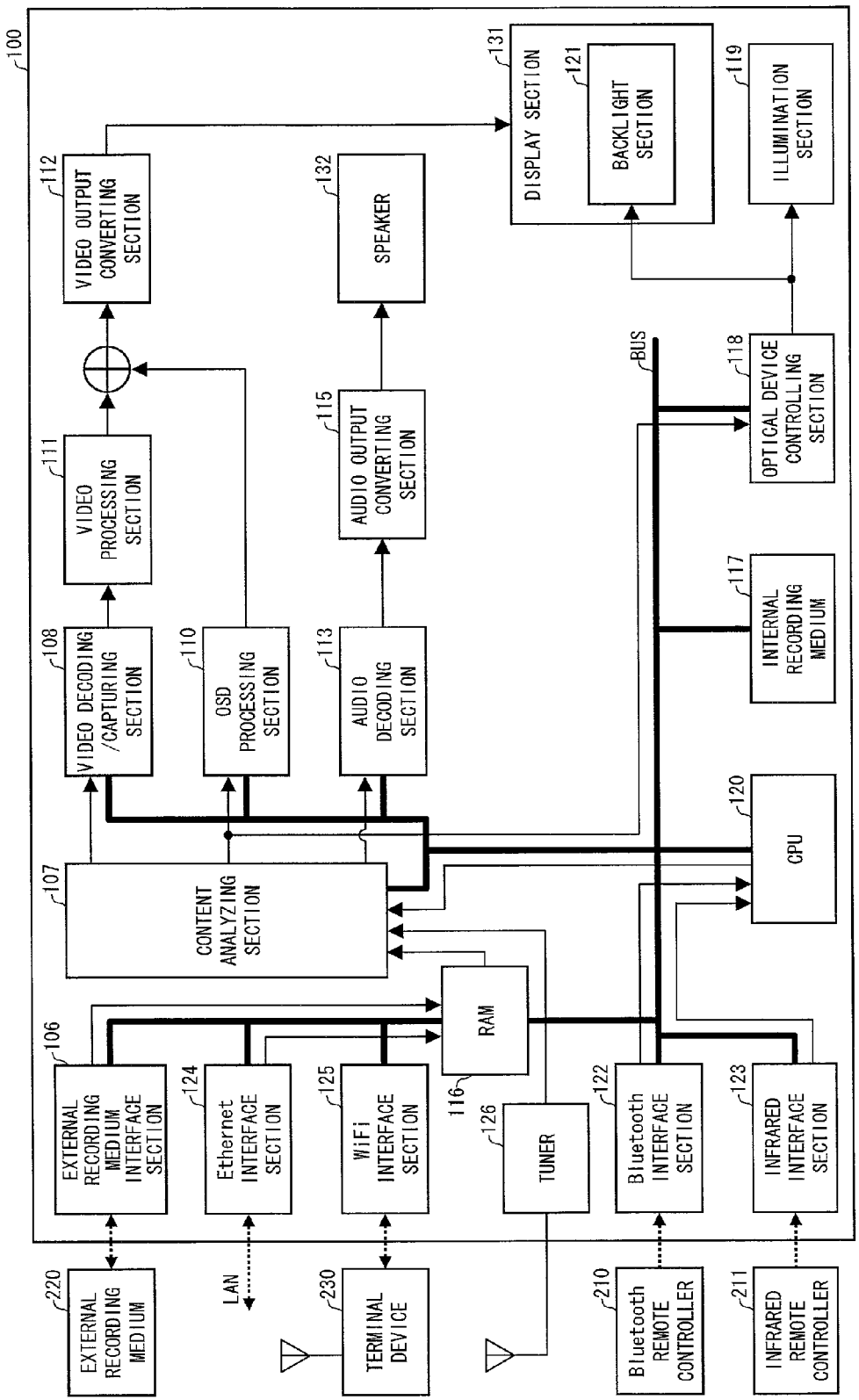
FIG. 1

The following description will discuss a television 100 of an embodiment of the present invention, with reference to FIGS. 1 and 2.

(Configuration of Television 100)

First, a configuration of a liquid crystal television (television 100) of the present embodiment will be described below with reference to FIG. 1. FIG. 1 is a block diagram illustrating the configuration of the television 100 of the present embodiment.

The television 100 includes an external recording medium interface section 106, a content analyzing section 107, a video decoding/capturing section 108, an OSD (on screen display) processing section 110, a video processing section 111, a video output converting section 112, an audio decoding section 113, an audio output converting section 115, an RAM 116, an optical device controlling section 118, an illumination section 119, a CPU 120, a backlight section 121, a Bluetooth® interface section 122, an infrared interface section 123, an Ethernet® interface section 124, a WiFi interface section 125, a tuner section 126, a display section 131, and a speaker 132 (see FIG. 1).

The external recording medium interface section 106 is an interface via which a recording medium 220 of an external device, such as a BD, a DVD, an HDD, or an SD card, is to be connected to the television 100 with the use of, for example, an HDMI connection or a USB connection.

The content analyzing section 107 (i) analyzes, in response to an instruction of the CPU 120, content stored by the RAM 116 (video content or static image content to be reproduced, such as content recorded in the external recording medium 220 or content received via the Ethernet interface section 124) and (ii) supplies data indicative of an analysis result to the OSD processing section 110 and the optical device controlling section 118.

The content analyzing section 107 supplies static image data of static image content to the video processing section 111, in a case of analyzing the static image content. For example, in a case where a slide show display of pieces of static image content is carried out by switching pieces of the static image content at predetermined reproduction intervals, the content analyzing section 107 (i) analyzes a piece of the static image content to be newly displayed, for each switching from one piece of static image content, which is to be displayed on the display section 131 in the slide show display, to another and (ii) supplies an analysis result of such a piece of the static image content to the OSD processing section 110 and the optical device controlling section 118.

In a case where the content analyzing section 107 analyzes video content, the content analyzing section 107 gradually supplies sound data and video data of the video content to the audio decoding section 113 and the video decoding/capturing section 108, respectively. Note that, in a case where the content analyzing section 107 analyzes video content, the content analyzing section 107 can (i) analyze moving image content at constant intervals (at predetermined reproduction intervals) of a whole reproduction period of the moving image content (for example, at intervals at which an image frame is outputted to the video decoding/capturing section 108) and (ii) supply an analysis result of the moving image content to the OSD processing section 110 and the optical device controlling section 118. Particularly, in a case where a three-dimensional video displaying device (hereinafter referred to as a 3D television) is realized by the television 100, the content analyzing section 107 (i) determines whether or not content recorded in the external recording medium 220, content received via the Ethernet interface section 124, content received via the WiFi interface section 125, or content stored in an internal recording medium 117 is 3D content or normal content (2D content) and (ii) supplies content to the video processing section 111 in accordance with a mode selected by a user (a 3D mode or a normal (2D) mode).

The video decoding/capturing section 108 decodes video data of content supplied from the content analyzing section 107, and then supplies the video data to the video processing section 111.

The video processing section 111 carries out various processes with respect to video data supplied from the video decoding/capturing section 108, and then supplies the video data to the video output converting section 112. The OSD processing section 110 creates image data indicative of an OSD, and then supplies the image data to the video output converting section 112, while OSD display is being enabled. UIs of the OSD display include, as components, characters such as human and/or animals, and an icon indicative of setting items. The characters have a decorative function of making lively the UIs of the OSD display. An expression on each character's face is configured to change in accordance with an analysis result supplied from the content analyzing section 107. A single color image (which is selectable from a plurality of images including warm color images and cold color images) is displayed as a background of the UI. Alternatively, a skin image (which is selectable from a plurality of skins including wood grain, metallic, and picture frame) is displayed as a background of the UI.

The video output converting section 112 (i) superimposes, on video data supplied from the video processing section 111, image data supplied from the OSD processing section 110 so as to convert them into a video signal and then (ii) supplies the video data to the display section 131.

The audio decoding section 113 carries out decoding of sound data of content supplied from the content analyzing section 107, and then supplies the sound data to the audio output converting section 115.

The audio output converting section 115 converts, into an audio signal, sound data supplied from the audio decoding section 113, and then supplies the audio signal to the speaker 132.

The RAM 116 is controlled by the CPU 120 to temporarily store data of content supplied via the external recording medium interface section 106 or via the Ethernet interface section 124.

The internal recording medium 117 stores user operation history information (pieces of information for respective pieces of content, each of which pieces of information is related to (i) the number of reproductions of content and (ii) the last date when the content was reproduced). The internal recording medium 117 further stores a keyword entered by a user.

Upon receipt of information indicating that a user has instructed a reproduction of video content, the CPU 120 reads out content from, for example, the external recording medium 220, and then records the content in the RAM 116. The CPU 120 further controls the content analyzing section 107 to read out the content from the RAM 116. The CPU 120 records the user operation history information in the internal recording medium 117.

In accordance with an analysis result supplied from the content analyzing section 107, the optical device controlling section 118 controls each LED (light emitting element) of the illumination section 119 and the backlight section 121 to emit light so that the light has, for example, luminance and emission intervals. The illumination section 119 individually or cooperatively illuminates illumination lamps for a display logo, an icon, and a touch sensor section (see FIG. 2) which are provided in, for example, a bezel provided so as to surround a display surface of a display of the television 100. The backlight section 121 illuminates the display surface of the display.

The illumination section 119 is made up of (i) a bezel of the television 100 (see an upper part of FIG. 2) and (ii) a plurality of LEDs which (a) emit light toward a periphery of the television 100 and (b) are provided behind the bezel. The optical device controlling section 118 controls the plurality of LEDs to be individually turned on or off. Note that a user can carry out various operations with respect to the television 100 by touching a touch sensor section of the bezel (see a lower part of FIG. 2).

Some of the plurality of LEDs of the illumination section 119 are provided behind (i) a maker logo ("SHARP" in the upper part of FIG. 2), (ii) a center icon ("^" in the upper part of FIG. 2) located in a center of a lower part of the bezel, and (iii) a power supply icon (power supply button section) of the touch sensor section (see the lower part of FIG. 2). The optical device controlling section 118 can control at least one LED of the plurality of LEDs, which at least one LED is provided behind the center icon and the power supply icon, to merely emit light in accordance with an analysis result, while controlling LEDs other than the at least one LED of the plurality of LEDs to be always turned off.

A three-dimensional television is classified into two methods for viewing 3D content. One of the two methods is a method in which a user views 3D content with a pair of 3D glasses on, and the other is a method in which a viewer views 3D content with the naked eyes. In either method, a 3D television can determine setting to a 3D display mode or a 2D display mode, automatically or in accordance with an instruction manually entered by a user. In a case where the television 100 is compatible with a 3D television, the optical device controlling section 118 can be configured to control the at least one LED of the illumination section 119 to emit light having different luminance or color depending on (i) a case where 3D content is reproduced in the 3D display mode, and (ii) a case where 2D content is reproduced in the 3D display mode.

The following description will concretely discuss how the optical device controlling section 118 controls emission of light, with reference to FIG. 2 and (*a*) of FIG. 4. In a case where the content analyzing section 107 determines, in the 3D display mode, that video content is 3D content, the optical device controlling section 118 controls an LED to emit light such that the center icon ("^") located in the center of the lower part of the bezel (see FIG. 2 and (*a*) of FIG. 4) is illuminated with, for example, blue light. In a case where the content analyzing section 107 determines, in the 3D display mode, that the video content is 2D content, the optical device controlling section 118 controls the LED to emit light such that the center icon is illuminated with white light or controls the LED to be turned off so that the center icon is not illuminated.

A 3D television of 3D glasses-type can bring about an effect of urging a user to prepare a pair of 3D glasses, by thus illuminating the center icon with blue light. A 3D television of naked eyes-type can bring about an effect of urging a user to, for example, push a 3D button of a remote controller, by thus illuminating the center icon with white light. Note that the 3D television of naked eyes-type has a problem that it has a viewing angle narrower than that of the 3D television of 3D glasses-type. However, the 3D television of naked eyes-type can bring about an effect of urging a user to move from a location where the user cannot three-dimensionally view a video to a location where the user can three-dimensionally view the video, by thus illuminating the center icon with blue light.

In a case where 3D content stored in the internal recording medium 117 is reproduced, the optical device controlling section 118 can control LEDs to simultaneously illuminate, with different colors of light, the maker logo ("SHARP" in the upper part of FIG. 2 or in (*a*) of FIG. 4) and the center icon. In a case where externally supplied 3D content (supplied via the external recording medium interface section 106, the Ethernet interface section 124, the WiFi interface section 125, or the tuner 126) is reproduced, the optical device controlling section 118 can control the LEDs to simultaneously illuminate, with an identical color of light, the maker logo and the center icon.

The optical device controlling section 118 can control LEDs such that the LED provided behind the center icon is different in at least one of emission modes from the LED provided behind the maker logo, depending on which external device having supplied 3D content (2D content) to the 3D television is reproduced by the 3D television. That is, the optical device controlling section 118 can control the LEDs such that the LED provided behind the center icon is different from the LED provided behind the maker logo in at least one of a turn on/off state and a color of light, depending on which external device of the external recording medium interface section 106, the Ethernet interface section 124, the WiFi interface section 125, and the tuner 126 has supplied the 3D content (2D content).

With the configuration, the 3D television can bring about an effect of notifying a user that the 3D television is reproducing video content supplied from which external device.

A 3D television having a bezel illustrated in (*b*) of FIG. 4 can be configured such that, in a case where the content analyzing section 107 determines that video content is 3D content, the optical device controlling section 118 can (i) control an LED, which is provided behind a 3D display section ("3D" in (*b*) of FIG. 4) located in a left edge of a lower part of the bezel, to emit blue light and (ii) control an LED, which is provided behind a 2D display section ("2D" in (*b*) of FIG. 4) located in a center of the lower part of the bezel, to emit white light or to be turned off.

With the configuration, the 3D television of 3D glasses-type can bring about an effect of urging a user to prepare a pair of 3D glasses. With the configuration, the 3D television of naked eyes-type can bring about an effect of urging a user to push a 3D button of a remote controller.

The 3D television having the bezel illustrated in (*b*) of FIG. 4 can be configured such that (i) the optical device controlling section 118 can control the LED provided behind the 3D display section to emit blue light in a case where 3D content stored in the internal recording medium 107 is reproduced, and (ii) the optical device controlling section 118 can control the LED provided behind the 2D display section to emit white light in a case where 2D content stored in the internal recording medium 107 is reproduced.

In this case, the 3D television having the bezel illustrated in (*b*) of FIG. 4 can be further configured such that, in a case where externally supplied content is reproduced, the optical device controlling section 118 can control (i) the LED provided behind the 3D display section and (ii) the LED provided behind the 2D display section, not to be turned on. Alternatively, the 3D television having the bezel illustrated in (*b*) of FIG. 4 can be configured such that, in a case where externally supplied 3D content (2D content) is reproduced, the optical device controlling section 118 can control the LED provided behind the 3D display section (or the 2D display section) to emit light having a color (for example, yellow) other than blue and white.

The 3D television having the bezel illustrated in (*b*) of FIG. 4 can be further configured such that the optical device controlling section 118 can control the LED provided behind the 3D display section (or the 2D display section) to emit light in a different mode depending on which external device having supplied 3D content (2D content) to the 3D television is reproduced by the 3D television. That is, the 3D television having the bezel illustrated in (*b*) of FIG. 4 can be configured such that the optical device controlling section 118 can control the LED provided behind the 3D display section (or the 2D display section) to emit light in the different mode depending on which external device of the external recording medium interface section 106, the Ethernet interface section 124, the WiFi interface section 125, and the tuner 126, the 3D content (2D content) has supplied the 3D content (2D content). Examples of "different mode" include different colors of light and different illumination intervals.

With the configuration, the 3D television can notify a user of whether internally stored content or content stored in an external device is being reproduced. This allows a user to notify that the 3D television is reproducing video content supplied from which external device, for example, by use a remote controller, on a screen displayed on the 3D television, on which screen the external device is to be operated. It is therefore possible to enhance convenience.

In a case where the optical device controlling section 118 controls the at least one LED, which is provided behind the display section, to emit light in accordance with a result of analysis of static image content, the optical device controlling section 118 can control the at least one LED to (i) emit bright light when a static image has bright average luminance (average luminance not less than a predetermined threshold), whereas (ii) emit dark light when the static image does not have the bright average luminance. Alternatively, the optical device controlling section 118 can control the illumination section 119 such that the at least one LED emits light having a color that is a main color of a color distribution of a static image.

The Bluetooth interface section 122 is an interface via which radio waves are received from a Bluetooth remote controller 210.

The infrared interface section 123 is an interface via which radio waves are received from an infrared remote controller 211.

The WiFi interface section 125 is an interface via which WiFi communication is established between the television 100 and a terminal device 230.

The tuner 126 receives broadcasting waves, and then outputs video content of a selected channel.

The display section 131 displays a video of content and an OSD in accordance with a video signal supplied from the video output converting section 112. The backlight section 121 of the display section 131 emits backlight necessary for displaying of the video.

The speaker 132 outputs a sound of content in accordance with an audio signal supplied from the audio output converting section 115.

The following description will specifically discuss in sequence (i) how the content analyzing section 107 analyses content and (ii) how the optical device controlling section 118 processes on the basis of an analysis result.

(How Content Analyzing Section 107 Analyses Content)

The content analyzing section 107 calculates at least one of the following five features, and then supplies a calculated feature to the OSD processing section 110 and the optical device controlling section 118.

1. Feature of each image frame of video content (for example, average luminance of pixels constituting a target image frame (examples of the feature include average luminance of an image frame), a total scalar quantity of at least one motion vector calculated from a target image frame and a previous image frame, and a color distribution)

2. Feature of sound data (examples of the feature include an amplitude of a sound signal for each constant time period of whole sound data, a frequency distribution of a sound signal for a constant time period, chord progression for a constant time period, a tempo for a constant time period, and chorus-section information indicating whether or not a part is a chorus-section)

3. Feature of a static image (examples of the feature include average luminance of pixels constituting a static image and a color distribution)

4. Additional information on content (examples of the additional information include character strings indicative of a title of content, a creator, artist information (information on, e.g. a lyric writer, a composer, and a singer), a release date, genre information, and instrumental information)

5. Information on user operation history (the number of reproduction(s) of content, and the last date when the content was reproduced)

Note that (i) the chord progression can be detected by, for example, a method disclosed in Japanese Patent Application Publication Tokukaihei No. 11-109972 A, (ii) the tempo can be detected by a method disclosed in Japanese Patent Application Publication Tokukai No. 2007-41108 A, and (iii) the chorus-section information can be detected by, for example, a method disclosed in Japanese Patent Application Publication Tokukai No. 2004-233965.

(How Optical Device Controlling Section 118 processes on the basis of Analysis Result)

The optical device controlling section 118 controls LEDs of the illumination section 119 in accordance with at least one type of feature which is supplied from the content analyzing section 107.

The following description will discuss an example of how to control in accordance with one type of feature.

(Case where Supplied Feature is "Total Scalar Quantity of Motion Vectors")

The optical device controlling section 118 controls the LEDs of the illumination section 119 to change their luminance in accordance with a total scalar quantity of motion vectors. Specifically, in a case where, for example, the total scalar quantity is not less than a predetermined threshold, the optical device controlling section 118 controls an LED, which emits light having constant luminance, to emit light having higher luminance, whereas controls the LED to emit light having lower luminance in a case where the total scalar quantity is less than the predetermined threshold.

The optical device controlling section 118 can change fade time intervals (cycle) at which each LED repetitively fades in and out, in accordance with the total scalar quantity of the motion vectors. Specifically, the optical device controlling section 118 can reduce the fade time intervals (control the LED to blink) in the case where the total scalar quantity is not less than the predetermined threshold, whereas can increase the fade time intervals in the case where the total scalar quantity is less than the predetermined threshold.

Note that two or more predetermined thresholds can be set, instead of the single predetermined threshold. In this case, the optical device controlling section 118 can change, at three or more stages, (i) luminance of the LED which emits light having the constant luminance and (ii) the fade time intervals. In the following examples, two or more thresholds can also be employed and control of LEDs can also be changed at three or more stages.

(Case where Supplied Feature is "Average Luminance of Image Frame")

In accordance with average luminance of an image frame, the optical device controlling section 118 controls the LEDs of the illumination section 119 to change their luminance, which LEDs emit light having constant luminance. Specifically, the optical device controlling section 118 controls the LEDs to emit light having higher luminance in a case where the average luminance is not less than a predetermined threshold, whereas controls the LEDs to emit light having lower luminance in a case where the average luminance is less than the predetermined threshold.

The optical device controlling section 118 individually controls the LEDs of the illumination section 119 to be turned on and off. This allows the illumination section 119 to express animation. Details of the animation to be expressed can be changed in accordance with the average luminance of the image frame.

(Case where Supplied Feature is "Amplitude of Sound Signal")

In accordance with an amplitude of a sound signal (an intensity of a sound), the optical device controlling section 118 controls the respective LEDs of the illumination section 119 to change their luminance, which respective LEDs emit light having constant luminance. Specifically, the optical device controlling section 118 controls the respective LEDs to emit light having higher luminance in a case where the amplitude value is not less than a predetermined threshold, whereas controls the respective LEDs to emit light having lower luminance in a case where the amplitude value is less than the predetermined threshold.

Alternatively, the optical device controlling section 118 can control LEDs, whose number varies depending on the amplitude of the sound signal, to be turned on. Specifically, for example, merely the first through k-th rows of LEDs from left, out of LEDs provided in a matrix manner behind a bezel, can be turned on (k is a value which varies depending on an amplitude of a sound signal).

Alternatively, the optical device controlling section 118 can control an LED to change a color of light in accordance with the amplitude of the sound signal.

(Case where Supplied Feature is "Frequency Distribution of Sound Signal")

The optical device controlling section 118 can be configured to control the LEDs, which are provided in the matrix manner behind the bezel, to be turned on and off, so that equalizer display is carried out in accordance with a frequency distribution of a sound signal. What is meant by "equalizer display carried out in accordance with the frequency distribution" is, for example, a process in which LEDs provided in a matrix manner of M lines and N rows are turned on or off as below. Specifically, in a case where an intensity of a frequency component contained in a predetermined frequency band i of a frequency distribution is the j-th stage out of predetermined M stages ($1 \leq i \leq N$, a frequency of a frequency band i increases as i increases), the optical device controlling section 118 controls j LEDs from bottom out of the i-th row of M LEDs from left to be turned on, whereas controls (M-j) LEDs in the i-th row to be turned off.

This makes it possible to carry out equalizer display which schematically illustrates a graph of a sound level, in which graph a lateral axis represents a frequency and a longitudinal axis represents an amplitude.

Alternatively, in a case where the intensity of the frequency component contained in the predetermined frequency band i of the frequency distribution is the j-th stage out of predetermined N stages ($1 \leq i \leq M$, a frequency of a frequency band i increases as i increases), the optical device controlling section 118 controls j LEDs from left out of the i-th line of N LEDs from bottom to be turned on, whereas controls (N-j) LEDs in the i-th line to be turned off.

This makes it possible to carry out equalizer display which schematically illustrates a graph of a sound level, in which graph a lateral axis represents an amplitude and a longitudinal axis represents a frequency.

(Case where Supplied Feature is "Tempo")

Alternatively, the optical device controlling section 118 can be configured to individually control the LEDs of the illumination section 119 on the basis of information of "tempo" detectable from a sound signal. Specifically, the optical device controlling section 118 can be configured to reduce the fade time intervals (that is, control the LEDs to blink) in a case where the tempo is not less than a predetermined threshold, whereas increase the fade time intervals in a case where the tempo is less than the predetermined threshold.

Alternatively, the optical device controlling section 118 can be configured to control the LEDs to change a color of light depending on whether or not the tempo is not less than the predetermined threshold. The color of light is specifically changed, for example, as follows. The color of light is changed to yellow in the case where the tempo is not less than the predetermined threshold, whereas the color of light is changed to blue in the case where the tempo is less than the predetermined threshold.

(Case where Supplied Feature is "Chorus-Section Information")

The optical device controlling section 118 can be configured to individually control the LEDs of the illumination section 119 on the basis of "chorus-section information" detectable from a sound signal. Specifically, the optical device controlling section 118 can individually control the LEDs to emit bright light in a case where the "chorus-section information" indicates that a part is a chorus-section, whereas can individually control the LEDs to emit dark light in a case where the part is not a chorus-section (that is, in a case where a sound represented by a sound signal is a sound of a verse part or a bridge part).

(Case where Supplied Feature is "Color Distribution")

The optical device controlling section 118 can be configured to individually control the LEDs of the illumination section 119 on the basis of information of "color distribution" detectable from an image frame of video content or static image content. Specifically, the optical device controlling section 118 can individually control the LEDs to emit bright light in a case where the "color distribution" includes colors (such as colors that satisfy Formula I where pixel values of R, G, and B are $P_R$, $P_G$, and $P_B$, respectively, and a predetermined threshold is TH) similar to primary colors (the "primary colors" include not only three primary colors of R, G, and B of light but also three primary colors of C, M, and Y, and white and black) whose number is greater than that of intermediate colors (colors that do not belong to the "colors similar to the primary colors"), whereas individually control the LEDs to emit dark light in a case where the "color distribution" does not include the colors similar to the primary colors whose number is greater than that of the intermediate colors.

[Mathematical Expression 1]

$$\text{Min}(255-P_R,P_R)+\text{Min}(255-P_G,P_G)+\text{Min}(255-P_B,P_B) \leq TH \quad \text{Formula 1}$$

Alternatively, the optical device controlling section 118 can be configured to reduce the fade time (that is, control the LEDs to blink) in the case where the "color distribution" includes the colors similar to the primary colors whose number is greater than that of the intermediate colors, whereas increase the fade time intervals in the case where the "color distribution" does not include the colors similar to the primary colors whose number is greater than that of the intermediate colors.

(Case where Supplied Feature is "Additional Information on Content")

The optical device controlling section 118 can individually control the LEDs as below in a case where a supplied feature is additional information on content, such as a "title of content", a "creator", "artist information", a "release date", "genre information", and "instrumental information".

Specifically, the optical device controlling section 118 can be configured to individually control the respective LEDs to change colors of light and/or luminance of the LEDs depending on whether or not a keyword, which is entered by a user and stored in the internal recording medium 117, matches additional information on content. For example, in a case where the colors of light is changed, the optical device controlling section 118 can individually control the LEDs to emit red light when the keyword matches the additional information on the content, whereas individually control the LEDs to emit white light when the keyword does not match the additional information on the content. Note that a criterion of whether or not the keyword matches the additional information on the content can be "match full" or "match partial". Also note that, even in a case where the keyword neither matches full nor matches partially the additional information on the content, the following cases can also be regarded as being matched.

In a case where (i) correlated two character strings are stored in advance in the external recording medium 117 so as to be correlated with each other and (ii) additional information and a keyword are stored as correlated two character strings, it is possible to regard such additional information as matching such a keyword. For example, in a case where a character string "string quartet" is stored so as to be correlated with character strings "violin", "viola", "violoncello", and "double bass" in the external recording medium 117, the "string quartet" which is a "title of content" matches "viola" which is a "keyword".

Alternatively, in a case where (i) a device, in which correlated two character strings are stored so as to be correlated with a database, is provided outside the television 100, (ii) the television 100 can access, via a network, the database of the device, and (iii) additional information on content and a keyword are stored in the database as correlated two character strings, it is possible to regard such additional information as matching such a keyword.

(Case where Supplied Feature is Particularly "Genre Information" of Additional Information)

The optical device controlling section 118 can be configured to individually control the LEDs of the illumination section 119 on the basis of "genre information" which is added, as additional information, to content.

The optical device controlling section 118 controls each of the LEDs to be turned on or off at constant time intervals. The present embodiment is, however, not limited to this. Alternatively, the optical device controlling section 118 can be configured to control each of the LEDs to change the constant time intervals on the basis of "genre information" of music content. For example, (i) the constant time intervals are made long in a case where the "genre information" of the music content is "classic", (ii) the constant time intervals are made medium long in a case where the "genre information" is "pops", and (iii) the constant time intervals are made short in a case where the "genre information" is "rock".

The optical device controlling section 118 can further control each of the LEDs to change a pattern in which the each of the LEDs is turned on and off, on the basis of the "genre information". For example, in a case where the "genre information" is "classic", LEDs arranged in a matrix manner are turned on sequentially from left, whereas in a case where the "genre information" is "pops" or "rock", the LEDs are turned on and off at random.

Alternatively, the optical device controlling section 118 can individually controls each of the LEDs to change its color of light and/or fade time intervals of the each of the LEDs on the basis of the "genre information". For example, in a case where the "genre information" is "classic", the fade time intervals are made long, whereas in the case where the "genre information" is "rock", the fade time intervals are made short (that is, the each of the LEDs blinks).

(Case where Supplied Feature is "User Operation History for Content")

The optical device controlling section 118 can individually control each of the LEDs as below, in a case where a supplied feature is user operation history such as "the number of reproductions of content" or "the last date when the contest was reproduced".

The optical device controlling section 118 can be configured to individually control each of the LEDs to change its color of light and/or its luminance, depending on "whether or not the number of reproductions of content is not less than a predetermined number" or "whether or not the last date when the content was reproduced is included in a predetermined time period starting from the present time".

The following description will discuss an example of how to control on the basis of not less than two types of feature quantities.

(Case where Supplied Features are "Total Scalar Quantity of Motion Vectors" and "Amplitude of Sound Signal")

The optical device controlling section 118 can be configured to control each of the LEDs to change its fade time intervals on the basis of the sum of (i) a value obtained by multiplying a "total scalar quantity of motion vectors" by a weighting factor $W_1$ and (ii) a value obtained by multiplying an "amplitude of sound signal" by a weighting factor $W_2$. Specifically, the optical device controlling section 118 can control each of the LEDs to make short the fade time intervals (that is, control the each of the LEDs to blink) in a case where the "total scalar quantity of motion vectors" and the "amplitude of sound signal" are large, whereas make long the fade time intervals in a case where the "total scalar quantity of motion vectors" and the "amplitude of sound signal" are small.

In a case where (i) the "total scalar quantity of motion vectors" is larger but the "amplitude of sound signal" is smaller and (ii) $W_1$ is sufficiently larger than $W_2$, the fade time intervals are made short. In contrast, the fade time intervals are made long in a case where $W_1$ is sufficiently smaller than $W_2$. Similarly, in a case where (i) the "total scalar quantity of motion vectors" is smaller but the "amplitude of sound signal" is larger and (ii) $W_1$ is sufficiently larger than $W_2$, the fade time intervals are made long. In contrast, the fade time intervals are made short in a case where $W_1$ is sufficiently smaller than $W_2$.

With such a configuration, it is possible to, for example, in a soccer game, quickly blink an illumination section in a scene, such as a scene coming immediately before a goal, in which players move large and the audience excitedly cheers. In contrast, it is possible to slowly change the illumination section in a scene, such as a scene coming immediately after a goal kick, in which the players relatively slowly move and the audience quietly cheers.

Note that the weighting factors $W_1$ and $W_2$ can be set during production of the television 100. Alternatively, the weighting factors $W_1$ and $W_2$ can be set, for example, in a menu, by a user.

The description has discussed how the optical device controlling section 118 controls the illumination section 119 on the basis of two or more features, i.e., "total scalar quantity of motion vectors" and the "amplitude of sound signal". The present embodiment is, however, not limited to this. The optical device controlling section 118 can therefore control the illumination section 119 on the basis of arbitrary two or more features.

(How Backlight Section 121 Processes on the Basis of Analysis Result)

The optical device controlling section 118 can control the backlight section 121 in a substantially same manner as it controls the illumination section 119. That is, the optical device controlling section 118 can control, in accordance with a feature, not only the luminance of each of the LEDs of the illumination section 119 but also luminance of a backlight of the backlight section 121. Note that description is omitted here as to how the optical device controlling section 118 controls the luminance of the backlight upon receipt of which feature. This is because the optical device controlling section 118 controls the luminance of the backlight in the same manner as it controls the luminance of each of the LEDs of the illumination section 119.

(How OSD Processing Section 110 Processes on the Basis of Analysis Result)

The OSD processing section 110 creates image data indicative of an OSD, on the basis of a feature supplied from the content analyzing section 107. The present embodiment is not limited to this. Alternatively, the OSD processing section 110 can be configured to change, in accordance with a feature, animation of an OSD included in image data. Specifically, the OSD processing section 110 can change a speed of or details of animation display in accordance with, for example, the "total scalar quantity of motion vectors" and the "amplitude of sound signal".

The OSD processing section 110 can further change a face expression of a character included in image data, in accordance with, for example, whether or not content to be reproduced is cheerful content. Note that whether or not the content to be reproduced is cheerful content is determined, for example, as below.

For example, the OSD processing section 110 can change a face expression of a character to a cheerful face expression, in a case where the feature supplied from the content analyzing section 107 is "genre information" out of additional information and the "genre information" indicates "variety". Note that, in a case where the content analyzing section 107 extracts, as a feature, "genre information", it can extract, as a feature, (i) "genre information" of content to be reproduced or (ii) "genre information" of content (for example, content whose additional information (such as "title") includes 'a character string that matches a character string included in additional information (such as "title") of the content to be reproduced') which is correlated to the content to be reproduced.

Alternatively, in a case where (i) the content analyzing section 107 (a) calculates how much a human, recognized in a static image of static image content (or in an image frame of video content that is being reproduced), smiles (a value quantitatively indicating how much the human smiles) and then (b) supplies the value as a feature to the OSD processing section 110 and (ii) the value is not less than a predetermined value, the OSD processing section 110 changes the face expression of the character to the cheerful face expression. Note that how much a human smiles is calculated by, for example, a best shot recognition method disclosed in Japanese Patent Application Publication Tokukai No. 2010-28773 or a method for calculating an overall evaluation value of smile, which is disclosed in Japanese Patent Application Publication Tokukai No. 2004-46591.

Alternatively, in a case where the OSD processing section 110 accepts a feature of "chord progression" from the content analyzing section 107, the OSD processing section 110 determines whether or not the "chord progression" contains major chords more than minor chords. In a case where the OSD processing section 110 determines that the "chord progression" contains major chords more than minor chords, the OSD processing section 110 changes the face expression of the character to the cheerful face expression. Otherwise, the OSD processing section 110 changes the face expression of the character to a gloomy face expression.

The OSD processing section 110 can be configured to change, in accordance with the "total scalar quantity of motion vectors", a motion of an icon to be included in image data. Specifically, for example, the ODS processing section 110 can control the icon to quickly jump up and down in a case where the "total scalar quantity of motion vectors" is not less than a predetermined threshold (in a case where a target, such as a human, included in an image moves vigorously), whereas control the icon to slowly move or stand still in a case where the "total scalar quantity of motion vectors" is less than the predetermined threshold.

The OSD processing section 110 can be configured to change a background color of an OSD screen or detail of a skin in accordance with a supplied feature. For example, the OSD processing section 110 can be configured to change a skin to a picture frame skin in a case where a feature indicates that an image frame is a picturesque image, whereas change an icon to a pop icon in a case where a feature indicates that an image frame is an animation-like image. Alternatively, in a case where "genre information" is contained in a supplied feature, the OSD processing section 110 can change a skin to a picture frame skin out of a plurality of picture frame skins in accordance with the "genre information".

(Modified Example of Illumination Section 119)

The description has discussed the case where the plurality of LEDs for emitting light around the television 100 are arranged, in a matrix manner, behind the illumination section 119. It should be noted that the arrangement of the plurality of LEDs in the illumination section 119 is not necessarily limited to this. For example, a plurality of LEDs can be arranged linearly or circularly.

In this case, the optical device controlling section 118 can individually control luminance of each of N LEDs arranged linearly or circularly so that equalizer display is carried out in accordance with a frequency distribution of a sound signal. Specifically, in a case where an intensity of a frequency component contained in a predetermined frequency band i of a frequency distribution is the j-th stage out of predetermined M stages ($1 \le i \le N$, a frequency of a frequency band i increases as i increases), the optical device controlling section 118 can control the i-th LED to emit light of the j-th stage of luminance out of predetermined M stages.

Such a configuration allows a user to understand a frequency distribution of a sound that is currently being made, by viewing the luminance of each of the LEDs.

For example, in a case where twelve LEDs are linearly arranged in the illumination section 119, the optical device controlling section 118 can carry out the following process.

Specifically, the optical device controlling section 118 can be configured to individually control the twelve LEDs of the illumination section 119 on the basis of information of "chord progression" detectable from a sound signal. More specifically, the optical device controlling section 118 can control the (i+1)-th LED from left to be turned on or off in accordance with whether or not a detected chord includes a component sound of a pitch class value i. Note that a component sound of a chord belongs to any one of twelve pitch classes of "do (pitch class value 0)", "do# (pitch class value 1)", "re" "re#", "mi" "fa", "fa#", "sol", "sol#", "la", "la#", and "si (pitch class value 11)". For example, in a case where a detected chord is a triad of "do", "mi", and "sol" (see Table 1), the first, the fifth, and the eighth LEDs from left are turned on, whereas LEDs other than the first, the fifth, and the eighth LEDs are turned off.

TABLE 1

| do | do # | re | re # | mi | fa | fa # | sol | sol # | la | la # | si |
|----|------|----|----|----|----|----|----|----|----|----|----|
| ○  |      |    |    | ○  |    |    | ○  |    |    |    |    |

(Advantage of Television 100)

According to the television 100, the content analyzing section 107 extracts a prescribed feature from content, and the optical device controlling section 118 controls, in accordance with an extracted feature, luminance of light to be emitted by the illumination section 119.

It follows that the television 100 changes, in accordance with a feature extracted from content to be reproduced, luminance of light to be emitted by the illumination section 119. For example, the television 100 controls the illumination section 119 to emit light having higher luminance in a case where the size of a motion vector is large such as a case where moving image content of a soccer game is reproduced, whereas controls the illumination section 119 to emit light having lower luminance in a case where the size of a motion vector is small such as a case where moving image content of a video of grassland is reproduced.

Each LED whose luminance is to be controlled by the television 100 is incorporated in the television 100. Therefore, a change in luminance of light emitted from the each LED does not make a person who is not viewing video content uncomfortable.

Therefore, the television 100 can certainly absorb a viewer in a reproduced video or make the viewer feel as if he were actually there, as compared with a conventional device, without making a non-viewer uncomfortable.

(Embodiment 2)

The following description will discuss a configuration of an audio device 300 of Embodiment 2 of the present invention, with reference to FIG. 3. FIG. 3 is a block diagram illustrating the configuration of the audio device 300 of Embodiment 2.

The audio device 300 includes an external recording medium interface section 106, a content analyzing section 107, an audio decoding section 113, an audio output converting section 115, an RAM 116, an optical device controlling section 118, an illumination section 119, a CPU 120, a Bluetooth interface section 122, an infrared interface section 123, an Ethernet interface section 124, and a speaker system 133 (see FIG. 3). Note that functions of members other than the speaker system 133 have been already described in Embodiment 1, and therefore descriptions of the members are omitted in Embodiment 2. Note, however, that the content analyzing section 107 and the optical device controlling section 118 of the audio device 300 are partially different in function from those of the television 100. Therefore, the content analyzing section 107 and the optical device controlling section 118 of the audio device 300 will be described together with the speaker system 133.

(Content Analyzing Section 107)

The content analyzing section 107 supplies an analysis result of sound content to the audio decoding section 113 and the optical device controlling section 118.

A process, in which the content analyzing section 107 supplies the analysis result of the sound content, is a process in which (i) at least one of "2. Feature of sound data", "4. Additional information on content", and "5. Information on user operation history" which has been described in Embodiment 1 is calculated and (ii) a calculated feature is supplied to the optical device controlling section 118. Note that, in a case where sound content, like stereo sound-capable content and surround sound-capable content, includes plural channels of sounds, the content analyzing section 107 can individually analyze the sounds of the respective channels and then supply analysis results of the sounds of the respective channels to the optical device controlling section 118.

(Speaker System 133)

The speaker system 133 includes a plurality of speakers, and is a stereo speaker system or a surround sound speaker system capable of making sounds of channels from respective different speakers.

(Optical Device Controlling Section 118)

The optical device controlling section 118 individually controls each LED of the illumination section 119 to be turned on or off. In a case where the optical device controlling section 118 accepts a feature, it carries out, with respect to the illumination section 119, a process identical to that described in Embodiment 1.

Note that the speakers of the speaker system 133 each can also include an illumination section 119 (not shown).

The optical device controlling section 118 can control, as below, the illumination sections 119 thus provided in the speaker system 133, in a case where (i) the content analyzing section 107 analyzes the plural channels of sounds, and (ii) a supplied feature is an "amplitude of sound signal".

Specifically, the optical device controlling section 118 can be configured to control LEDs of an illumination section 119 provided in a speaker for making a sound of each channel included in sound content, to emit light having luminance corresponding to an "amplitude of sound signal" of the each channel (the each LED is turned off in a case where the "amplitude of sound signal" is 0 (zero)). Such a configuration makes it possible to emit light merely from LEDs of a left speaker of a stereo speaker system, in a case where (i) the speaker system 133 is the stereo speaker system and (ii) merely the left speaker of the stereo speaker system is making a sound.

(Additional Description)

According to Embodiment 1, the OSD processing section 110 and the optical device controlling section 118 each carry out control on the basis of an analysis result of the content analyzing section 107. However, Embodiment 1 is not limited to this. The OSD processing section 110 and the optical device controlling section 118 can be configured so that merely one of them carries out control in accordance with an instruction issued from a user. Alternatively, the optical device controlling section 118 can be configured to control merely one of the illumination section 119 and the backlight section 121 in accordance with an instruction issued from a user.

The content analyzing section 107 can be configured to control the display section 131 to display not only content but also an image or a video as to an artist of the content (for example, an illustration of the artist, a jacket for an album of the artist, and a jacket for another album of the artist).

In a case where the content analyzing section 107 supplies, as a feature, additional information of content to a subsequent section, the content analyzing section 107 can use, as the additional information, (a) meta-information included in data of the content and (b) information obtained from the meta-information via the Internet. For example, the content analyzing section 107 of Embodiment 2 can (i) supply TOC information, which is included in data of a music CD that serves as an external recording medium, to a CDDB server on the Internet via a network interface section 124, (ii) receive, from the CDDB server, a song title and information on an artist in accordance with the TOB information, and (iii) supply, as features, the song title and the information of the artist to the subsequent section.

When a reproduction of content is ended, (i) a state of each of the LEDs of the illumination section 119, (ii) the luminance of the backlight section 121, and (iii) display modes such as animation of an OSD, a skin, and a character, can be returned to respective display modes at the starts of the reproduction of the content. Alternatively, the modes at the end of the reproduction of the content can be maintained.

According to Embodiments 1 and 2, each of the television 100 and the audio device 300 includes the illumination section 119. However, the television 100 or the audio device 300 does not necessarily include the illumination section 119. The television 100 and the audio device 300 each can be configured such that an illumination device for emitting light, like the illumination section 119, is provided outside of the television 100 or the audio device 300, and the optical device controlling section 118 of the television 100 or the audio device 300 controls the illumination device. Such a configuration also makes it possible to attain the present invention.

Similarly, the display section 131, the speaker 132, and the speaker system 133 are not necessarily included in the television 100 or the audio device 300. The present invention can be attained by supplying a signal of a video and/or a sound to be reproduced by the television 100 or the audio device 300 to an external display device, a speaker device, and a speaker system which have respective functions identical to those of the display section 131, the speaker 132, and the speaker system 133.

The backlight section 121 can be a direct backlight provided behind a liquid crystal panel (not shown) or can be an edge light backlight.

According to Embodiments 1 and 2, some LEDs of the illumination section 119 are provided behind the maker logo, the center icon (""), and the power source icon of the touch sensor section of the bezel. It should be noted that the present invention is not limited to this. An LED for illuminating the maker logo of the bezel can be provided anywhere other than behind the maker logo. In this case, however, it is necessary to separately provide, in the television 100, light guide means for guiding light emitted from the LED such that the maker logo is illuminated with the light (this is true for the center icon and the power supply icon). Note that various conventionally well-known means can be applied to the light guide means. A light guide plate of a liquid crystal panel can be employed as the light guide means in a case where a bezel is a part of the liquid crystal panel.

According to Embodiment 1, the television 100 includes the bezel illustrated in the upper part of FIG. 2. It should be noted that the present invention is not limited to this. The television 100 can include a bezel, as illustrated in (a) of FIG. 4, in which a maker icon is arranged above a center icon. Alternatively, the center icon can be arranged not in a center of a lower side of the bezel but in a center of an upper side of the bezel.

In a case where the television 100 is provided to be compatible with a 3D-capable television, the television 100 can include a bezel as illustrated in (b) of FIG. 4. In this case, the optical device controlling section 118 of the television 100 can control (i) an LED for illuminating a "3D" logo (see (b) of FIG. 4) to emit light having luminance in accordance with a feature during 3D display and (ii) an LED for illuminating a "2D" logo to be turned off during the 3D display. Reverse control is carried out during 2D display.

For example, the optical device controlling section 118 can control, during 3D display, the luminance or fade time intervals of the LED for illuminating the "3D" logo and can control, during 2D display, the luminance or fade time intervals of the LED for illuminating the "2D" logo.

In a case where a feature of sound data extracted from moving image content or sound content by the content analyzing section 107, the optical device controlling section 118 can also control the illumination section 119 to emit, from an LED for illuminating a center icon, light having luminance in accordance with the feature. For example, in a case where an amplitude of a sound signal extracted for each constant period of time is not less than a predetermined threshold, the optical device controlling section 118 can control the LED for illuminating the center icon to blink while the speaker 132 is making a sound represented by the sound signal, whereas can control the LED to be turned off while the speaker 132 is making the sound in a case where the amplitude of the sound signal is less than the predetermined threshold.

Alternatively, in a case where the content analyzing section 107 extracts a feature indicating whether the sound data is stereo sound or monaural sound, the optical device controlling section 118 can control the LED for illuminating the center icon as below. That is, the optical device controlling section 118 can control the LED for illuminating the center icon to be turned on in a case where the feature indicates that the sound data is the stereo sound, whereas control the LED to be turned off in a case where the feature indicates that the sound data is the monaural sound. Alternatively, in a case where the content analyzing section 107 extracts a feature indicating whether or not the sound data contains a subvoice, the optical device controlling section 118 can control the LED for illuminating the center icon as below. Specifically, the optical device controlling section 118 can control the LED for illuminating the center icon to be turned on in a case where the feature indicates that the sound data contains no subvoice, like video content containing merely Japanese sound, whereas control the LED to be turned off in a case where the feature indicates that the sound data contains subvoice, like bilingual video content.

(Program and Recording Medium)

Finally, blocks of each of the television 100 and the audio device 300 can be realized by hardware or can be realized by software with the use of a CPU (Central Processing Unit) as follows:

That is, each of the television 100 and the audio device 300 can store a computer-readable control program code (executable program, intermediate code program, or source program) for realizing functions of each of the television 100 and the audio device 300. Each of the television 100 and the audio device 300 (or CPU or MPU) can retrieve and execute a program code stored in a supplied recording medium.

A recording medium that supplies a program code to the television 100 or the audio device 300 can be, for example, a tape, such as a magnetic tape or a cassette tape; a disk including (i) a magnetic disk such as a Floppy® disk or a hard disk and (ii) an optical disk such as CD-ROM, MO, MD, DVD, or CD-R; a card such as an IC card (memory card) or an optical card; or a semiconductor memory such as a mask ROM, EPROM, EEPROM, or flash ROM.

The present invention can be attained by arranging the television 100 or the audio device 300 to be connectable to a communications network. In the case, the program code is delivered to the television 100 or the audio device 300 over the communications network. The communications network is not limited to a specific type or shape provided that the communications network can deliver the program code to the television 100 or the audio device 300, and therefore can be, for example, the Internet, an intranet, extranet, LAN, ISDN, VAN, CATV communications network, mobile communications network, or satellite communications network.

The transfer medium which constitutes the communications network is not limited to a specific configuration or type provided that the transfer medium can transmit the program code, and therefore can be, for example, wired line such as IEEE 1394, USB (Universal Serial Bus), electric power line, cable TV line, telephone line, or ADSL (Asymmetric Digital Subscriber Line) line; or wireless such as infrared radiation (IrDA, remote control), Bluetooth®, 802.11 wireless, HDR, mobile telephone network, satellite line, or terrestrial digital network. The present invention encompasses a carrier wave, in which computer data signal which is embodied by electronic transmission of the program codes, is embedded.

The present invention is not limited to the description of the embodiments above, and can therefore be modified by a skilled person in the art within the scope of the claims. Namely, an embodiment derived from a proper combination of technical means disclosed in different embodiments is encompassed in the technical scope of the present invention.

It is preferable to configure the content reproduction device of the present invention such that the content is the moving image content, the extraction means extracts, during reproduction of each image frame, the feature from the each image frame included in the moving image content, and the light-emitting controlling means controls the light emitting section to emit, for the each image frame, light having luminance in accordance with the feature extracted from a corresponding image frame by the extraction means.

The configuration allows the content reproduction device to yield a further effect of controlling in real time, in accordance with details of a video or a sound that is being reproduced, luminance of light to be emitted by the light emitting section, even in a case where a piece of moving image content is being reproduced.

It is preferable to configure the content reproduction device of the present invention such that the feature extracted for the each image frame by the extraction means is a total scalar quantity of at least one motion vector obtained from (i) a corresponding image frame and (ii) its previous image frame which has been reproduced.

It is preferable to configure the content reproduction device of the present invention such that the feature extracted from the data of the sound for the each predetermined reproduction period by the extraction means is a feature indicating an intensity of the sound to be reproduced during the corresponding predetermined reproduction period.

It is preferable to configure the content reproduction device of the present invention such that the light emitting section includes a plurality of light emitting elements capable of individually emitting light, and the light-emitting controlling section controls the luminance of the light to be emitted from the light emitting section, by controlling merely light emitting elements out of the plurality of light emitting elements to be turned on, the number of the light emitting elements varying depending on the intensity of the sound indicated by the feature extracted by the extraction means.

It is preferable to configure the content reproduction device of the present invention such that the light-emitting controlling means (i) controls the luminance of the light, which is to be emitted by the light emitting section, to be repetitively increased and decreased regardless of the feature extracted by the extraction means and (ii) changes, in accordance with the feature, a cycle on which the luminance of the light is increased and decreased.

It is preferable to configure the content reproduction device of the present invention such that the feature extracted from the data of the sound for the each predetermined reproduction period by the extraction means is chorus-section information indicating whether or not the sound to be reproduced during the corresponding predetermined reproduction period is a chorus-section of the sound of the content, and the light-emitting controlling section controls the light emitting section to emit, for the each predetermined reproduction period, light having different luminance depending on whether or not the chorus-section information extracted during the corresponding predetermined reproduction period by the extraction period indicates that the sound, to be reproduced during the corresponding predetermined reproduction period, is a chorus-section.

It is preferable to configure the content reproduction device of the present invention such that the content is the static image content, the extraction means extracts, as the feature, average luminance obtained by averaging luminance of pixels constituting the static image content, and the light-emitting controlling means controls the light emitting section to emit, around the light emitting section, light having luminance in accordance with the average luminance.

The configuration allows the content reproduction device of the present invention to yield a further effect of more deeply absorbing a viewer who views static image content in the static image content.

It is preferable to configure the content reproduction device of the present invention such that the light emitting section emits light around the content reproduction device.

According to the configuration, the light emitting section emits light around the content reproduction device. This allows the content reproduction device to yield a further effect of more deeply making a viewer feel as if he were actually there.

It is preferable to configure the content reproduction device of the present invention such that the light emitting section includes a plurality of light emitting sections, the extraction means extracts features from respective sounds of a plurality of channels, in a case where a sound of content to be reproduced is made up of the sounds of the respective plurality of channels, and the light-emitting controlling means individually controls luminance of light emitted from the respective plurality of light emitting sections in accordance with a different feature out of the features extracted by the extraction means.

According to the configuration, the content reproduction device can yield a further effect of visually notifying a viewer of an intensity of a sound of a channel, which sound is outputted from a speaker. The further effect is yielded by arranging in advance a light emitting section and the speaker to be close to each other, the light emitting section emitting light whose luminance is to be controlled in accordance with a feature, the speaker outputting the sound from which the feature is extracted.

It is preferable to configure the content reproduction device of the present invention such that the extraction means extracting, as the feature(s), from the content, a character string which is added as additional information of the content, the content reproduction device, further including: determination means for determining whether or not a keyword registered by a user matches the character string extracted by the extraction means, and the light-emitting controlling means controlling the light emitting section(s) to emit light having different colors depending on whether or not the determination means has determined that the keyword matches the character string.

It is preferable to configure the content reproduction device of the present invention to further include OSD image creating means for creating an on-screen display image in accordance with the feature(s) extracted by the extraction means.

It is preferable to configure the content reproduction device of the present invention such that the output device is a display, and the light emitting section is incorporated in a bezel which is provided so as to surround a display surface of the display.

According to the configuration, the content reproduction device of the present invention emits light having luminance in accordance with the feature from the light emitting section incorporated in the bezel provided so as to surround the display surface of the display.

Therefore, the content reproduction device of the present invention can yield a further effect of more deeply absorbing a viewer in reproduced content or making the viewer feel as if he were actually there.

It is preferable to configure the content reproduction device of the present invention such that a power supply button section is provided in the bezel, the light emitting section is made up of a plurality of light emitting elements, and the light-emitting controlling means controls at least one of luminance and a color of light to be emitted by not only a first light emitting element of the plurality of light emitting elements, which first light emitting element illuminates the power supply button section, but also a second light emitting element of the plurality of light emitting elements, which second light emitting element is provided in a center of a lower side of or an upper side of the bezel.

According to the configuration, the content reproduction device of the present invention can not only control, during reproduction of content, a light emitting element to emit light in accordance with the feature to the power supply button section, but also control, in accordance with the feature, luminance and/or a color of light to be emitted by a light emitting element outstandingly located in a display.

Therefore, the content reproduction device of the present invention can yield a further effect of easily notifying a user who is viewing a display that content is being reproduced even in a case where details of the content that is being reproduced is not displayed on the display.

It is preferable to configure the content reproduction device of the present invention such that the output device is a liquid crystal display, and the light emitting section is a backlight section for emitting light with which a liquid crystal panel of the liquid crystal display is illuminated.

According to the configuration, the liquid crystal display does not need to include, separately from the backlight section, a light emitting section which enables a viewer to be deeply absorbed in reproduced content or to feel as if he were actually there. This yields a further effect that even a general liquid crystal display can more deeply absorb a viewer in reproduced content or make the viewer feel as if he were actually there.

The content reproduction device can be attained as, for example, a content reproduction device configured such that the output device is a liquid crystal display, the light emitting section includes a first light emitting section and a second light emitting section, the first light emitting section being a backlight for emitting light with which a liquid crystal panel of the liquid crystal display is illuminated, the second light emitting section being incorporated in a bezel provided so as to surround a display surface of the liquid crystal display, and the light-emitting controlling means controls, in accordance with the feature, at least one of luminance and a color of light to be emitted from at least one of the first light emitting section and the second light emitting section.

The present invention encompasses a television receiver including: each means; a light emitting section; and an output device, which are provided in the content reproduction device.

The present invention encompasses (i) a program for causing the content reproduction device to operate, the program for causing a computer to function as each of the means, and (ii) a computer-readable recording medium for storing the program.

INDUSTRIAL APPLICABILITY

The present invention is broadly applicable to AV apparatuses capable of reproducing a sound and a video.

REFERENCE SIGNS LIST

100: television (content reproduction device, output device, display, liquid crystal display, television receiver)
106: external recording medium interface section
107: content analyzing section (extraction means)
108: video decoding/capturing section
110: OSD processing section (OSD image creating means)
111: video processing section
112: video output converting section
113: audio decoding section
115: audio output converting section
116: RAM
118: optical device controlling section (light-emitting controlling means)
119: illumination section (light emitting section, second light emitting section)
120: CPU
121: backlight section (light emitting section, first light emitting section)
131: display section
132: speaker
300: audio device (content reproduction device)
133: speaker system

The invention claimed is:

1. A content reproduction device for controlling an output device to output a video or a sound of reproduced content, the content reproduction device, comprising:
   extraction means for extracting a prescribed feature from content, the extraction means for extracting, from the content, as the feature, a character string which is added as additional information of the content;
   determination means for determining whether or not a keyword registered by a user matches the character string extracted by the extraction means; and
   light-emitting controlling means for controlling, in accordance with an extracted feature, luminance of light to be emitted by a light emitting section incorporated in the output device,
   the light-emitting controlling means controlling the light emitting section to emit light having different colors depending on whether or not the determination means has determined that the keyword matches the character string.

2. The content reproduction device as set forth in claim 1, wherein:
   the content is static image content, moving image content, or sound content,
   during reproduction of the content, the extraction means extracts, for each predetermined reproduction period, the feature from data of a video or a sound to be reproduced during a corresponding predetermined reproduction period, and
   the light-emitting controlling means controls the light emitting section to emit, for the each predetermined reproduction period, light having luminance in accordance with the feature extracted during the corresponding predetermined reproduction period by the extraction means.

3. The content reproduction device as set forth in claim 2, wherein:
   the content is the moving image content, the extraction means extracts, during reproduction of each image frame, the feature from the each image frame included in the moving image content, and the light-emitting controlling means controls the light emitting section to emit, for the each image frame, light having luminance in accordance with the feature extracted from a corresponding image frame by the extraction means.

4. The content reproduction device as set forth in claim 3, wherein:

the feature extracted for the each image frame by the extraction means is a total scalar quantity of at least one motion vector obtained from (i) a corresponding image frame and (ii) its previous image frame which has been reproduced.

5. The content reproduction device as set forth in claim 2, wherein:

the feature extracted from the data of the sound for the each predetermined reproduction period by the extraction means is a feature indicating an intensity of the sound to be reproduced during the corresponding predetermined reproduction period.

6. The content reproduction device as set forth in claim 5, wherein:

the light emitting section includes a plurality of light emitting elements capable of individually emitting light, and the light-emitting controlling section controls the luminance of the light to be emitted from the light emitting section, by controlling merely light emitting elements out of the plurality of light emitting elements to be turned on, the number of the light emitting elements varying depending on the intensity of the sound indicated by the feature extracted by the extraction means.

7. The content reproduction device as set forth in claim 5, wherein:

the light-emitting controlling means (i) controls the luminance of the light, which is to be emitted by the light emitting section, to be repetitively increased and decreased regardless of the feature extracted by the extraction means and (ii) changes, in accordance with the feature, a cycle on which the luminance of the light is increased and decreased.

8. The content reproduction device as set forth in claim 2, wherein:

the feature extracted from the data of the sound for the each predetermined reproduction period by the extraction means is chorus-section information indicating whether or not the sound to be reproduced during the corresponding predetermined reproduction period is a chorus-section of the sound of the content, and the light-emitting controlling section controls the light emitting section to emit, for the each predetermined reproduction period, light having different luminance depending on whether or not the chorus-section information extracted during the corresponding predetermined reproduction period by the extraction period indicates that the sound, to be reproduced during the corresponding predetermined reproduction period, is a chorus-section.

9. The content reproduction device as set forth in claim 2, wherein:

the content is the static image content, the extraction means extracts, as the feature, average luminance obtained by averaging luminance of pixels constituting the static image content, and the light-emitting controlling means controls the light emitting section to emit, around the light emitting section, light having luminance in accordance with the average luminance.

10. The content reproduction device as set forth in claim 1, wherein:

the light emitting section emits light around the content reproduction device.

11. The content reproduction device as set forth in claim 10, wherein:

the light emitting section includes a plurality of light emitting sections, the extraction means extracts features from respective sounds of a plurality of channels, in a case where a sound of content to be reproduced is made up of the sounds of the respective plurality of channels, and the light-emitting controlling means individually controls luminance of light emitted from the respective plurality of light emitting sections in accordance with a different feature out of the features extracted by the extraction means.

12. A content reproduction device as set forth in claim 1, further comprising:

OSD image creating means for creating an on-screen display image in accordance with the feature(s) extracted by the extraction means.

13. The content reproduction device as set forth in claim 1, wherein:

the output device is a display, and the light emitting section is incorporated in a bezel which is provided so as to surround a display surface of the display.

14. The content reproduction device as set forth in claim 13, wherein:

a power supply button section is provided in the bezel, the light emitting section is made up of a plurality of light emitting elements, and the light-emitting controlling means controls at least one of luminance and a color of light to be emitted by not only a first light emitting element of the plurality of light emitting elements, which first light emitting element illuminates the power supply button section, but also a second light emitting element of the plurality of light emitting elements, which second light emitting element is provided in a center of a lower side of or an upper side of the bezel.

15. The content reproduction device as set forth in claim 1, wherein:

the output device is a liquid crystal display, and the light emitting section is a backlight section for emitting light with which a liquid crystal panel of the liquid crystal display is illuminated.

16. The content reproduction device as set forth in claim 1, wherein:

the output device is a liquid crystal display, the light emitting section includes a first light emitting section and a second light emitting section, the first light emitting section being a backlight for emitting light with which a liquid crystal panel of the liquid crystal display is illuminated, the second light emitting section being incorporated in a bezel provided so as to surround a display surface of the liquid crystal display, and the light-emitting controlling means controls, in accordance with the feature, at least one of luminance and a color of light to be emitted from at least one of the first light emitting section and the second light emitting section.

17. A television receiver comprising:
each means; a light emitting section; and an output device, which are included in a content reproduction device recited in claim 1.

18. A content reproduction method of a content reproduction device for controlling an output device to output a video or a sound of reproduced content,
said method, comprising the steps of:
(a) extracting a prescribed feature from content, in the step of (a), a character string which is added as additional information of the content being extracted from the content as the feature;
(b) determining whether or not a keyword registered by a user matches the character string extracted in the step of (a); and
(c) controlling, in accordance with an extracted feature, luminance of light to be emitted by a light emitting section incorporated in the output device,
in the step (c), the light emitting section being controlled to emit light having different colors depending on whether or not it has been determined in the step of (b) that the keyword matches the character string.

19. A non-transitory computer-readable recording medium for storing a content reproduction program for causing a content reproduction device recited in claim 1 to operate, the content reproduction program for causing a computer to function as each of the means.

\* \* \* \* \*